US012637004B2

(12) United States Patent
Ikari

(10) Patent No.: US 12,637,004 B2
(45) Date of Patent: May 26, 2026

(54) IMAGING SYSTEM, MOVABLE UNIT, AND IMAGING METHOD

(71) Applicant: CANON KABUSHIKI KAISHA, Tokyo (JP)

(72) Inventor: Daiki Ikari, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 36 days.

(21) Appl. No.: 18/752,862

(22) Filed: Jun. 25, 2024

(65) Prior Publication Data

US 2025/0074306 A1 Mar. 6, 2025

(30) Foreign Application Priority Data

Aug. 30, 2023 (JP) ................................. 2023-140387

(51) Int. Cl.
*B60R 1/00* (2022.01)
*B60R 1/24* (2022.01)
*G06V 20/52* (2022.01)
*G06V 20/58* (2022.01)

(52) U.S. Cl.
CPC ............... *B60R 1/002* (2013.01); *B60R 1/24* (2022.01); *G06V 20/52* (2022.01); *G06V 20/58* (2022.01); *B60R 2300/202* (2013.01); *B60R 2300/802* (2013.01)

(58) Field of Classification Search
CPC ..... B60R 1/002; B60R 1/24; B60R 2300/202; B60R 2300/802; G06V 20/52; G06V 20/58; G06V 20/56
See application file for complete search history.

(56) References Cited

U.S. PATENT DOCUMENTS

| | | | |
|---|---|---|---|
| 11,214,196 B1* | 1/2022 | Hadir ..................... | H04N 23/54 |
| 2015/0025731 A1* | 1/2015 | Uehara ............... | B60W 50/082 701/23 |
| 2018/0338095 A1* | 11/2018 | Aihara ................. | H04N 23/951 |
| 2020/0406819 A1* | 12/2020 | Berne ...................... | B60R 1/28 |
| 2022/0074171 A1* | 3/2022 | Izumikawa ............... | B60R 1/27 |
| 2022/0220705 A1* | 7/2022 | Lee ...................... | H04N 5/2621 |
| 2025/0162505 A1* | 5/2025 | Ambrosetti ............... | G06T 7/20 |

FOREIGN PATENT DOCUMENTS

| | | | | |
|---|---|---|---|---|
| CN | 110983914 A | * | 4/2020 | ............... B60R 1/00 |
| JP | 2020-195008 A | | 12/2020 | |

OTHER PUBLICATIONS

Translation of CN110983914 (Year: 2020).*

* cited by examiner

*Primary Examiner* — Jason A Flohre
(74) *Attorney, Agent, or Firm* — Carter, DeLuca & Farrell LLP

(57) ABSTRACT

An imaging system includes an imaging unit disposed on a movable unit, and a processor configured to output image data acquired by the imaging unit to a display unit. The imaging unit is configured to perform imaging at a higher resolution in a peripheral area of an imaging angle of view than that in a central area. A first imaging area in front of the movable unit in a moving direction of the movable unit is imaged in a part of the peripheral area, a second imaging area is imaged in the central area, and a third imaging area closer to the movable unit than the second imaging area is imaged in another part of the peripheral area.

1 Claim, 7 Drawing Sheets

IMAGING SYSTEM, MOVABLE UNIT, AND IMAGING METHOD

BACKGROUND

Technical Field

One of the aspects of the embodiments relates to an imaging system mounted on a movable unit (movable object or body), such as an service vehicle (service platform).

Description of Related Art

Service vehicles that are used at construction sites have systems that use sensors and cameras attached to the vehicle body to surveil the trespass of workers around the service vehicle and issue an alert in a case where the trespass is detected. Moreover, a certain level of quality is demanded for the work by the service vehicle. For example, bulldozers are demanded to have the quality of excavation and leveling, and road rollers are demanded to have the quality of compaction.

Japanese Patent Laid-Open No. 2020-195008 discloses a system configured to display a combined image obtained by imaging the work area around the service vehicle and the nearby area that contacts the service vehicle using a plurality of cameras attached to the service vehicle.

The system disclosed in Japanese Patent Laid-Open No. 2020-195008 requires the plurality of cameras. These cameras are attached to the roof of the service vehicle, and thus the resolution of the cameras may be insufficient to obtain detailed information about the work area of the service vehicle (for example, the presence of small foreign objects (materials, matters, or particles) or garbage in the work area). The imaging angle of view of the camera is to be narrowed to obtain detailed information about the work area, and may be insufficient to confirm the safety of the service vehicle.

SUMMARY

An imaging system according to one aspect of the disclosure includes an imaging unit disposed on a movable unit, and a processor configured to output image data acquired by the imaging unit to a display unit. The imaging unit is configured to perform imaging at a higher resolution in a peripheral area of an imaging angle of view than that in a central area. A first imaging area in front of the movable unit in a moving direction of the movable unit is imaged in a part of the peripheral area, a second imaging area is imaged in the central area, and a third imaging area closer to the movable unit than the second imaging area is imaged in another part of the peripheral area. A movable unit having the above imaging system also constitutes another aspect of the disclosure. An imaging method corresponding to the above imaging system also constitutes another aspect of the disclosure.

Further features of various embodiments of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a description will be given of embodiments according to the disclosure.

Figure 1:
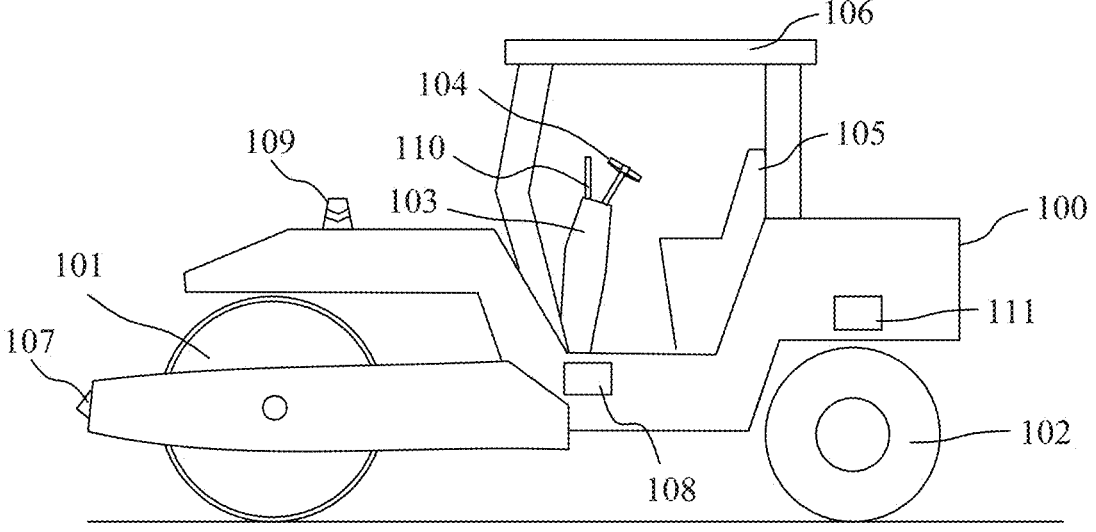
FIG. 1 is an external view of a service vehicle mounted with an image pickup apparatus according to the embodiment.

FIG. 1 illustrates the appearance of a road roller (service vehicle) 100, which is an example of a movable unit mounted with an imaging system for a movable unit according to this embodiment. The road roller 100 is a combined type road roller having a single iron wheel on one side (at the front in FIG. 1) of the front and two tires on the other side (at the rear in FIG. 1), and performs ground compaction work using the iron wheel during driving.

The road roller may be a tandem type road roller having a single iron wheel on the front and one on the rear, a macadam type road roller having a single iron wheel on the front and two on the rear, or something other than a combined type road roller. The service vehicle may also be something other than a road roller, such as an asphalt finisher, a motor grader, and a bulldozer.

A compaction roller 101 as the iron wheel is made, for example, of a metal drum. The compaction roller 101 is rotatable by an unillustrated hydraulic motor. A tire 102 is, for example, a rubber tire, and is rotatable by an unillustrated hydraulic motor.

A drive unit 111 drives an unillustrated hydraulic pump by a drive source such as an engine, and a hydraulic motor is driven by pressure oil sent from the hydraulic pump, thereby driving the compaction roller 101 and the tires 102 to rotate.

A driver's seat 105 has a seat where an operator who operates the road roller 100 sits. The upper part of the driver's seat 105 is covered by a roof part 106. A control table (console) 103 is provided in front of the driver's seat 105, and supports a steering device 104 and a display unit 110. The operator can control a moving direction (driving or traveling direction) of the road roller 100 (i.e., steer the road roller 100) by operating the steering device 104.

An imaging unit 107 is disposed in front of the road roller 100 as an image pickup apparatus included in the movable unit imaging system. The imaging unit 107 images the front (in the moving direction) of the road roller 100 and the back including the vicinity of the road roller 100 to generate imaging data. The imaging system for the movable unit includes a control unit 108, an alert unit (alarm or warning unit) 109, and a display unit 110 in addition to the imaging unit 107.

The control unit 108 includes a microcomputer consisting of one or more processors such as a Central Processing Unit (CPU) that performs calculations and control, and a Read Only Memory (ROM) and a Random Access Memory (RAM) that are main memories. The ROM stores basic setting data and programs for executing processing related to the camera. The microcomputer loads a program corresponding to the processing to be executed from the ROM and loads it into the RAM, and causes each block in the control unit 108, which will be described later, to execute an operation.

The control unit 108 is also connected to the imaging unit 107, the display unit 110, and the drive unit 111 via cables (not illustrated). The control unit 108 executes various processing for the imaging data acquired from the imaging unit 107, and transmits the processing result to the display unit 110. In other words, the control unit 108 outputs image data generated by executing various processing for the imaging data acquired from the imaging unit 107 to the display unit 110. The control unit 108 controls the alert unit 109 and the drive unit 111 according to the processing result.

The alert unit 109 has an alert light such as a rotating light. The alert light may include LEDs of multiple colors, and the light color may be controlled according to the type of alert. The alert unit 109 may be a buzzer that emits an alert sound, and may be controlled to emit different alert sounds depending on the type of alert.

The display unit 110 has a display device such as a liquid crystal display, and displays an image to assist the operator in his work (such as images of the front and bottom of the road roller 100). The operator seated in the driver's seat 105 can operate the steering device 104 while looking at the image displayed on the display unit 110 to steer the road roller 100.

A description will be given of the optical characteristic of the optical system of the imaging unit 107. The imaging unit 107 according to this embodiment has a configuration that allows imaging with a higher resolution in the peripheral area than that in the central area of the imaging angle of view. More specifically, the optical characteristic of the optical system is set so that imaging can be performed with a higher resolution in the peripheral area than in the central area within the imaging angle of view.

Figures 2A, 2B, 2C:
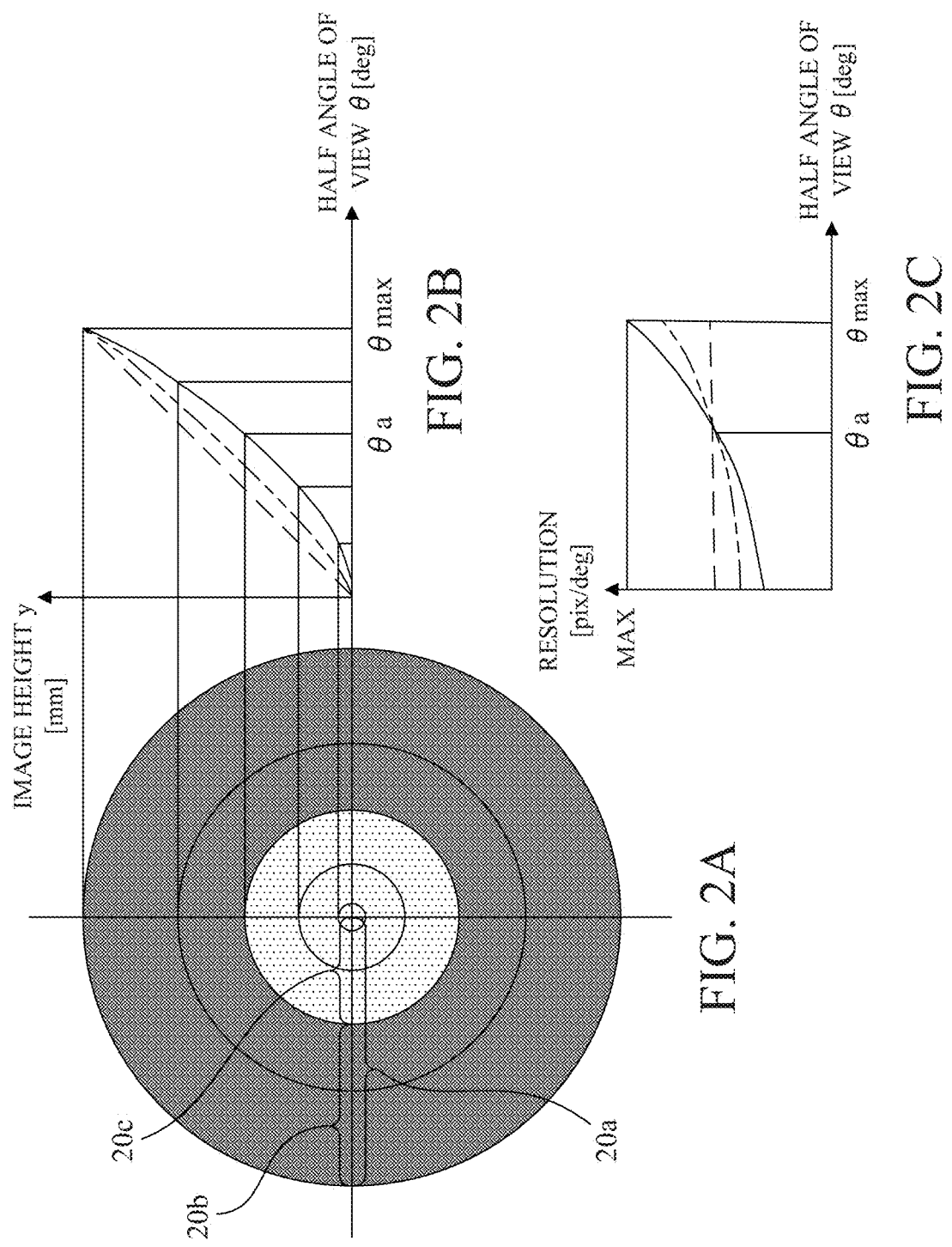
FIGS. 2A, 2B, and 2C illustrate an optical characteristic of the image pickup apparatus according to this embodiment.

FIG. 2A illustrates an image height on an image plane (light receiving surface of the image sensor) for each angle of view of the optical system according to this embodiment using contour lines. FIG. 2B illustrates a relationship between a half angle of view $\theta$ and an image height y (projection characteristic) of the optical system according to this embodiment. In FIG. 2B, the horizontal axis represents the half angle of view (angle between the optical axis of the optical system and the incident light) $\theta$(deg), and the vertical axis represents the image height y (mm) on the light receiving surface. A dashed line in FIG. 2B represents the projection characteristic of a typical equidistant projection (y=f$\theta$), and an alternate long and two short dashes line represents a projection characteristic of a stereographic projection (y=2f tan($\theta$/2)). A solid line represents a projection characteristic y($\theta$) of the optical system according to this embodiment.

As illustrated in FIG. 2B, unlike equidistant projection in which image height y increases in proportion to the half angle of view $\theta$, the optical system according to this embodiment has a projection characteristic in which the increase rate of y against $\theta$ changes from the optical axis center ($\theta$=0) to the maximum half angle of view $\theta$max. More specifically, between the optical axis center ($\theta$=0) and the maximum half angle of view $\theta$max, y is lower than y=f$\theta$, and the increase rate of y against $\theta$ increases as $\theta$ increases. In other words, the increase rate of y against $\theta$ is larger in the peripheral area away from the optical axis than the increase rate of y against $\theta$ in the central area near the optical axis. This projection characteristic is similar to the stereoscopic projection. However, the optical system according to this embodiment has a projection characteristic in which the increase rate of y against $\theta$ is smaller in the central area and is larger in the peripheral area than that in the stereoscopic projection.

Where a change amount in the image height y per unit angle of view (i.e., the number of pixels of the image sensor per unit angle of view) will be referred to as resolution, the optical system according to this embodiment has a projection characteristic in which the resolution changes according to the half angle of view $\theta$. The local resolution is expressed as the differential value dy($\theta$)/d$\theta$ of the projection characteristic y($\theta$) at half angle of view $\theta$. That is, as the slope of the projection characteristic y($\theta$) in FIG. 2B increases, the resolution increases. As the interval between the contour lines in FIG. 2A increases, the resolution increases. In the optical system according to this embodiment, the resolution in the peripheral area is higher than the resolution in the central area.

FIG. 2C illustrates a relationship between the half angle of view $\theta$ and the resolution (resolution characteristic) of the optical system. In FIG. 2C, the horizontal axis represents the half angle of view $\theta$, and the vertical axis represents the resolution (pix/deg). A dashed line in FIG. 2C represents a resolution characteristic of equidistant projection, and an alternate long and two short dashes line represents a resolution characteristic of the stereoscopic projection. A solid line represents a resolution characteristic of the optical system according to this embodiment. In the equidistant projection, the resolution is the same regardless of the angle of view. In contrast, the optical system according to this embodiment has a resolution characteristic in which the resolution in the central area is lower than y=f$\theta$, the resolution in the peripheral area is higher than y=f$\theta$, and as $\theta$ increases, the resolution increases. Such a resolution characteristic is similar to that of the stereoscopic projection. However, in comparison with the stereoscopic projection, the optical system according to this embodiment has a resolution characteristic in which the resolution is lower in the central area and higher in the peripheral area.

In the following description, as illustrated in FIGS. 2A, 2B, and 2C, a range of an imaging angle of view from θ=0 to θmax will be referred to as a full angle of view range 20a, and a central area of the full angle of view range 20a where the half angle of view θ is less than a predetermined half angle of view θa will be referred to as a low resolution region 20c. A peripheral area of the full angle of view range 20a where the half angle of view θ is equal to or larger than the predetermined half angle of view θa will be referred to as a high resolution region 20b. The predetermined half angle of view θa referred to here is θ in a case where dy(θ)/dθ matches dy(θ)/dθ of y=fθ. As to distortion, the low resolution region 20c is a high distortion region with large distortion, and the high resolution region 20b is a low distortion region with smaller distortion than the high distortion region.

The optical characteristics illustrated in FIGS. 2A, 2B, and 2C are merely examples, and it is sufficient as long as a low resolution region is formed at the central portion and a high resolution region is formed at the peripheral portion. In this embodiment, the low resolution region 20c and the high resolution region 20b of the optical system of the imaging unit 107 are formed concentrically, but they do not necessarily have to be concentric. For example, the low resolution region and the high resolution region may have distorted shapes. The centers of gravity of the low resolution region and the high resolution region do not have to coincide with each other, and each may be offset from the center of the light receiving surface.

The following inequality (1) may be satisfied:

$$0.20 \leq 2f\tan(\theta\max/2)/y(\theta\max) \leq 0.95 \qquad (1)$$

where f is a focal length, θ is a half angle of view, y is an image height on the image plane, y(θ) is a projection characteristic, and θmax is a maximum half angle of view. Inequality (1) may be replaced with inequality (1a):

$$0.25 \leq 2f\tan(\theta\max/2)/y(\theta\max) \leq 0.94 \qquad (1a)$$

Inequality (1) may be replaced with inequality (1b):

$$0.30 \leq 2f\tan(\theta\max/2)/y(\theta\max) \leq 0.80 \qquad (1b)$$

In an optical system having such optical characteristic, the magnification in the radial direction relative to the optical axis can be adjusted by adjusting the projection characteristic y(θ). Thereby, the aspect ratio in the radial direction and the circumferential direction from the optical axis can be controlled. As a result, unlike conventional fisheye lenses, a high-resolution optical image with a wide angle of view and small distortion on the peripheral side can be obtained.

Figure 3:
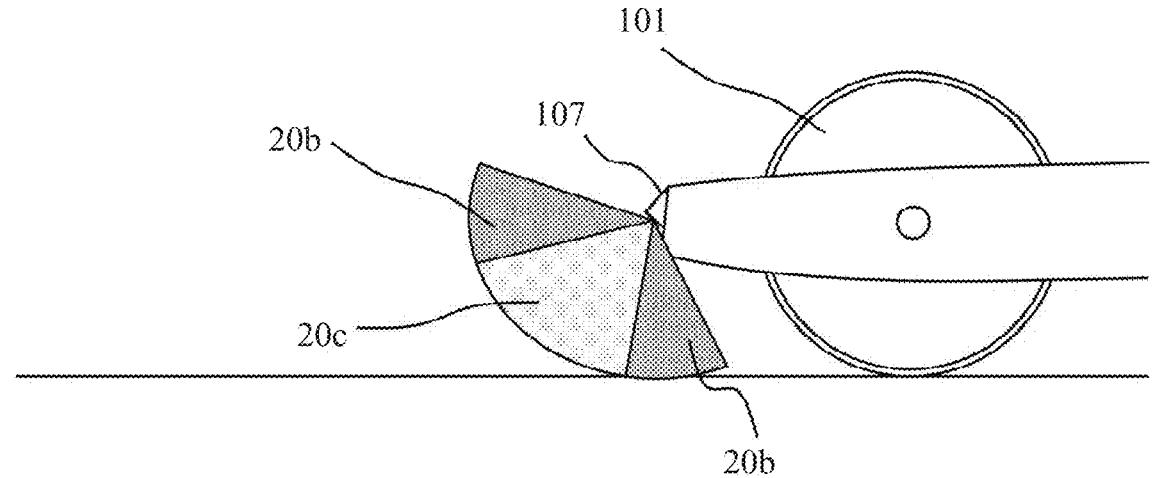
FIG. 3 illustrates a position and imaging direction of an imaging unit of the image pickup apparatus according to this embodiment.

Referring now to FIG. 3, a description will be given of the arrangement of the imaging unit 107 and the setting of the imaging area (imaging method). FIG. 3 illustrates an enlarged view of the imaging unit 107 and its periphery in FIG. 1. In FIG. 3, the imaging unit 107 is disposed in front of the compaction roller 101 of the road roller 100. The imaging unit 107 is disposed so that the optical axis of the optical system faces downward from the horizontal direction. The imaging unit 107 has an overall angle of view, for example, of about 150°.

The imaging unit 107 is disposed so that the upper angle of view area of the high resolution region 20b faces the front in the moving direction of the road roller 100, and the lower angle of view area of the high resolution region 20b faces an imaging area (referred to as a work area hereinafter) near the contact position of the compaction roller 101 as the roller part on the ground. As a result, the low resolution region 20c faces an imaging area (referred to as a front ground area hereinafter) in front of the contact position of the compaction roller 101 as the roller part on the ground. That is, the imaging unit 107 images a first imaging area in front with a part of the high resolution region 20b, images a front ground area (second imaging area) with the low resolution region 20c, and simultaneously images a work area (third imaging area) closer to the service vehicle than the front ground area with the other part of the high resolution region 20b.

Figure 6:
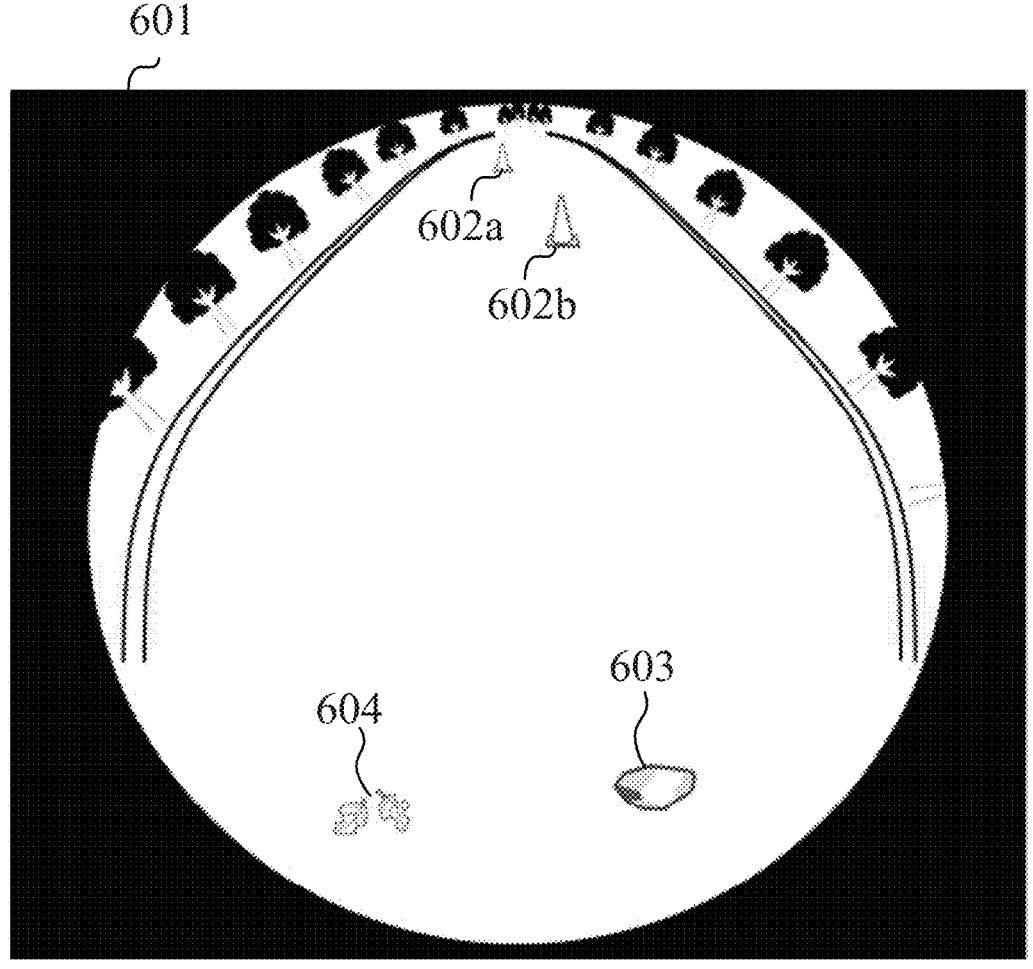
FIG. 6 illustrates an example of a captured image in this embodiment.

FIG. 6 illustrates an example of an image generated from imaging data from the imaging unit 107. An image 601 is a single image including an image of the front in the moving direction, an image of the front ground area, and an image of the work area. FIG. 6 illustrates triangular cones 602a and 602b as obstacles present in the moving direction. These triangular cones 602a and 602b are distant from the road roller 100, but are captured at high resolution through the high resolution region (upper angle of view area) 20b of the imaging unit 107. FIG. 6 illustrates fallen leaves 604 and a rock 603 as foreign objects present in the work area. These fallen leaves 604 and rocks 603 are small objects, but are captured at high resolution through the high resolution region (lower angle of view area) 20b of the imaging unit 107. The obstacle corresponds to a first object related to safety, and the foreign object corresponds to a second object related to work quality (i.e., a different type from the first object).

Thus, the imaging unit 107 configured to perform imaging at a higher resolution in the peripheral area (20b) of the entire angle of view range 20a than that in the central area (20b) can clearly capture obstacles that may come into contact in the moving direction and foreign objects that may lead to a decrease in work quality in the work area. Therefore, it is possible to more accurately detect such obstacles and foreign objects based on image data obtained by imaging.

A general wide-angle camera or fisheye camera may be used as the imaging unit 107. In this case, a camera may be used as long as it can effectively detect obstacles and foreign objects on the peripheral side even if a high-resolution image cannot be obtained on the peripheral side as illustrated in FIG. 6.

Figure 4:
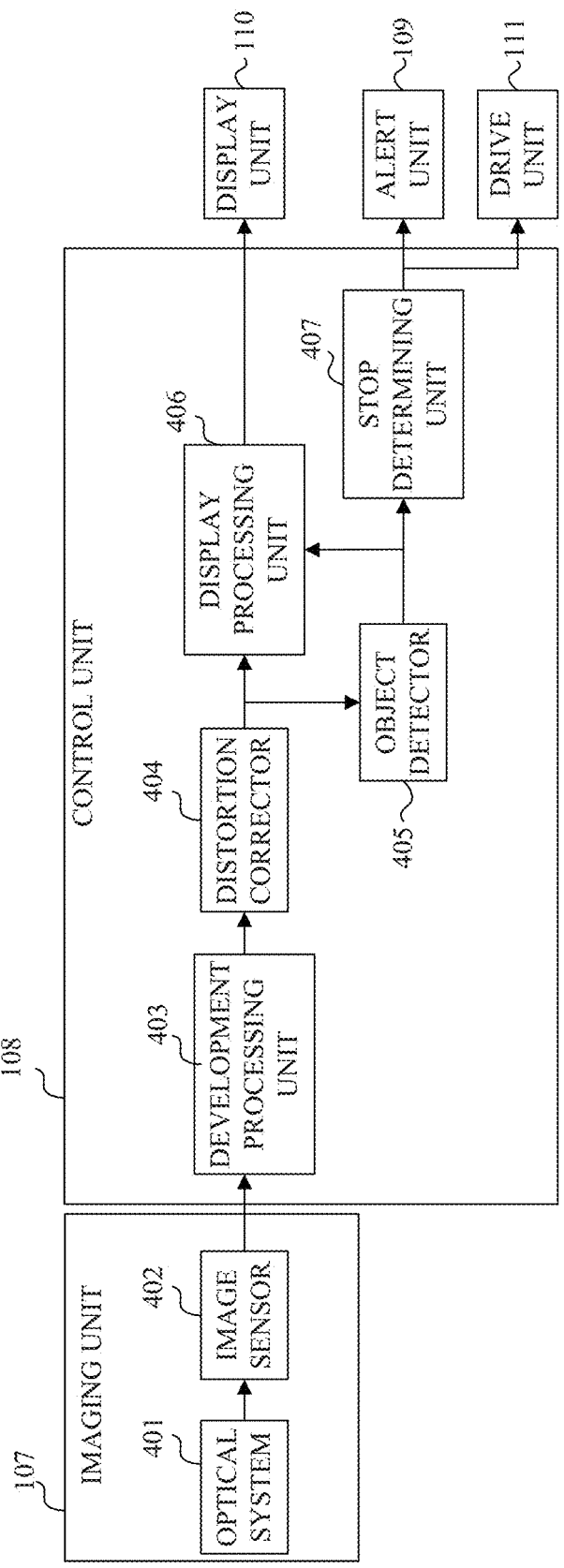
FIG. 4 is a block diagram illustrating configurations of the imaging unit and control unit according to this embodiment.

FIG. 4 illustrates the detailed configurations of the imaging unit 107 and the control unit 108. The imaging unit 107 includes an optical system 401 configured to form an object image (optical image) by imaging light from the outside, and an image sensor 402 configured to capture the object image by photoelectric conversion. The optical system 401 includes a plurality of lenses, and has the optical characteristic illustrated in FIGS. 2A, 2B, and 2C. The image sensor 402 is a Complementary Metal Oxide Semiconductor (CMOS) sensor or a Charge Coupled Device (CCD) sensor, and generates imaging data by photoelectrically converting the object image on its light receiving surface (imaging surface). The imaging data read out of the image sensor 402 is output to the control unit 108 in the subsequent stage.

The control unit 108 has a development processing unit 403, a distortion corrector 404, an object detector 405, a display processing unit 406, and a stop determining unit 407. The development processing unit 403 performs development processing for the imaging data from the imaging unit 107 (image sensor 402) to generate image data, and further performs image processing such as Wide Dynamic Range (WDR) correction, gamma correction, and Look Up Table (LUT) processing for the image data.

The distortion corrector 404 performs distortion correction processing as coordinate conversion for all or part of the image data input from the development processing unit 403 in order to display it on the rectangular screen of the display unit 110. At this time, in a case where the input image data has little distortion, it is directly output to the display unit 110 without distortion correction processing. The processing by the development processing unit 403 and the distortion corrector 404 can improve the visibility of the image displayed on the display unit 110 and improve a detection rate of the object detecting processing performed by the object detector 405. The image data processed by the distortion corrector 404 is output to the object detector 405 and the display processing unit 406.

The object detector 405 performs object detecting processing using the image data input from the distortion corrector 404, and determines whether or not obstacles such as vehicles, people, and traffic cones, and foreign objects such as a fallen leaf and a rock are present in the image data. Deep learning is used for the object detecting processing. Another deep learning may use, for example, You Only Look Once (YOLO), which is easy to learn and has fast detection. Other deep learning methods may include Single Shot MultiBox Detector (SSD), Faster Regional Convolution Neural Network (R-CNN), Fast R-CNN, and R-CNN. The result of the object detecting processing is output as four-point coordinate information, which is the coordinates of the four vertices of a rectangle (bounding box) indicating the detected position of the object, and object name information indicating the classification of the detected object.

In the object detecting processing, a different learning result may be applied according to the angle of view of the image data to detect different objects. That is, learning results of obstacles such as vehicles, people, and triangular cones may be applied to the upper part of the angle of view, and learning results of foreign objects such as fallen leaves and rocks may be applied to the lower part of the angle of view. Thereby, for image data obtained through the imaging unit 107 disposed as described in FIG. 3, obstacle detecting processing is performed in the moving direction of the road roller 100, and foreign object detecting processing is performed in the direction of the ground (work area) where compaction work is performed by the compaction roller 101. That is, limiting the detection target by the angle of view can realize accurate and high-speed object detecting processing.

The display processing unit 406 performs cutout processing or the like for the image data input from the distortion corrector 404 in accordance with the display resolution of the display unit 110, and generates display image data to be displayed on the display unit 110. The display processing unit 406 may cut out a plurality of image areas from the input image data and combine them to generate a single display image datum. For example, an image area in the moving direction and an image area in the ground direction may be cut out and combined to generate a single display image datum. Thereby, a display image corresponding to the image data input to the display processing unit 406 is displayed on the display unit 110.

The display processing unit 406 also adds the object detection result received from the object detector 405 to the display image data. For example, a bounding box is superimposed on the display image data so that the detected object and its position can be clearly recognized by the observer as the operator. Thereby, a bounding box surrounding the object is superimposed on the display image on the display unit 110. Instead of displaying the bounding box, the outline of the object may be displayed in a bold line of a conspicuous color, or an arrow pointing to the object may be displayed.

Figure 7:
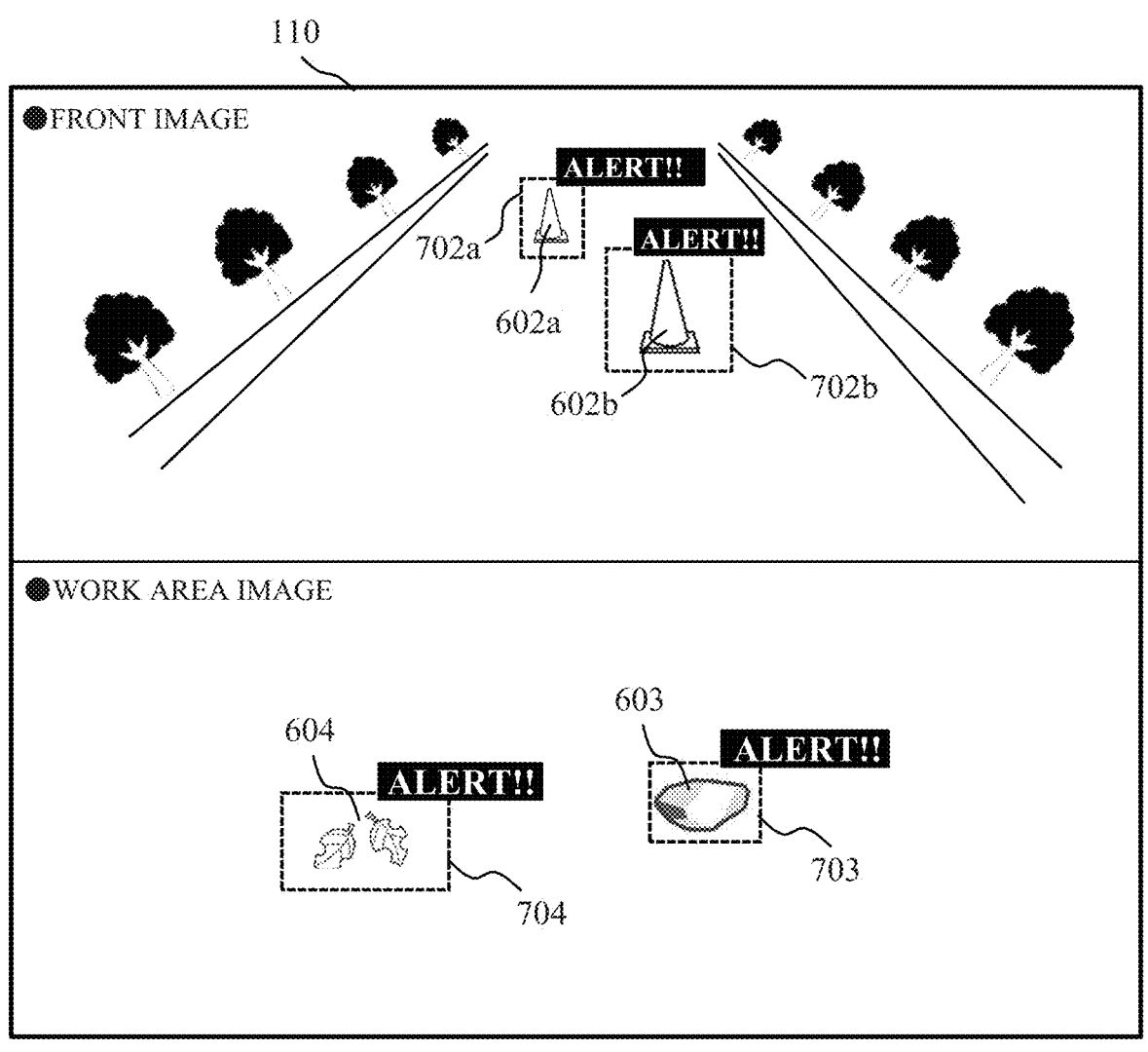
FIG. 7 illustrates an example of a displayed image in this embodiment.

FIG. 7 illustrates an example of an image (moving image) displayed on the display unit 110. The display image illustrated in FIG. 7 is divided into two parts, top and bottom, with the top part including a (front) image in the moving direction and the bottom part including a (work area) image of the work area in the ground direction. This display image is generated by combining the image areas in the moving direction and the ground direction cut out by the display processing unit 406 from the image data whose distortion has been corrected by the distortion corrector 404 so as to connect them vertically.

A bounding box is also superimposed on the display image as an object detecting result by the object detector 405. More specifically, an obstacle detecting frame 702a, which is a bounding box, is displayed as a result of detecting the triangular cone 602a in the front image, and an obstacle detecting frame 702b is displayed as a result of detecting a triangular cone 602b. By displaying the obstacle detecting frame in this way, the operator looking at the display unit 110 can easily notice the approach of an obstacle in the moving direction.

In the case where the road roller 100 is automated (unmanned) or remotely controlled, an operator in a remote location can easily notice that the road roller is approaching an obstacle by looking at the display apparatus at hand.

The work area image includes a foreign object detecting frame 703, which is a bounding box, as a result of detecting a rock 603, and a foreign object detecting frame 704 as a result of detecting fallen leaves 604. By displaying the foreign object detecting frame in this manner, even if the work area on the ground is in a blind spot for the operator sitting in the driver's seat 105 while riding on the road roller 100, the presence of the foreign object in the work area can be easily noticed through the display unit 110. In addition, in the case where the road roller 100 is automated or remotely controlled, an operator in a remote location can easily notice that a foreign object is present near the compaction roller 101 by looking at the display apparatus at hand.

The displayed obstacle detecting frame and foreign object detecting frame may be different in color or line type (including thickness) so that the operator can immediately distinguish between an obstacle and a foreign object.

Displaying images as described above can prevent a decrease in safety due to the road roller 100 coming into contact with an obstacle, and a decrease in work quality due to compaction of foreign objects.

The stop determining unit 407 determines whether or not to stop the road roller 100 based on the object detecting result received from the object detector 405. At this time, it may determine that the road roller 100 is to be stopped as soon as any object is detected, or it may determine that the road roller 100 is to be stopped in a case where the road roller 100 approaches a predetermined position (distance) from the detected object. It may also determine whether or not to stop the road roller 100 according to the classification of the detected object. For example, it may determine that the road roller 100 is to be stopped for safety in a case where an obstacle such as a vehicle, person, or traffic cone is detected, and may determine not to stop the road roller 100 in a case where a foreign object such as fallen leaves is detected. In a case where the stop determining unit 407 determines that the road roller 100 is to be stopped, it sends a stop signal to the drive unit 111, and the road roller 100 stops driving.

In a case where an object is detected by the object detector 405, the stop determining unit 407 sends an alert signal according to the type of object to the alert unit 109 to cause the alert unit 109 to perform an alert operation. For example, in a case where the object detector 405 detects an obstacle such as a person, it sends an alert signal related to safety to the alert unit 109, causing the alert unit 109 to turn on, for example, a red alert light. In a case where the object detector 405 detects a foreign object such as fallen leaves, it sends an alert signal related to the work quality to the alert unit 109, causing the alert unit 109 to turn on, for example, a yellow alert light. Thus, different alert operations may be performed according to the type of object detected. In a case where the alert unit 109 is a buzzer, different buzzer sounds may be generated according to the detected object by sending an alert signal according to the type of object detected to the alert unit 109.

Figure 5:
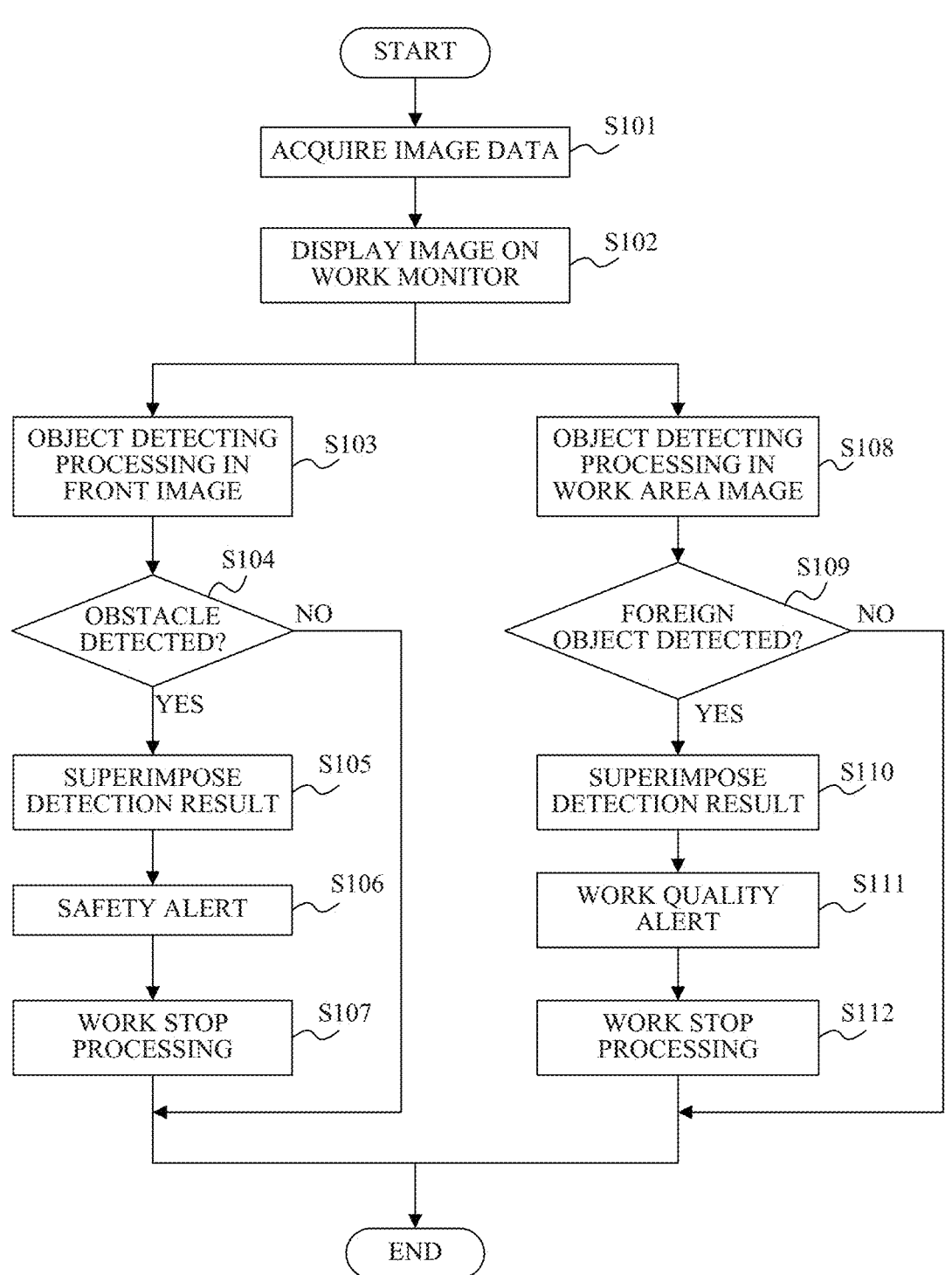
FIG. 5 is a flowchart illustrating processing according to this embodiment.

The flowchart in FIG. 5 illustrates the camera control processing (imaging control method) executed by the control unit 108 according to a program. The control unit 108 repeatedly executes this processing during driving to perform work of the road roller 100.

In step S101, the control unit 108 causes the imaging unit 107, which is a front camera, to perform imaging to obtain image data. This image data includes image data in the moving direction of the road roller 100 and image data of the ground (work area) just in front of the compaction roller 101, as illustrated in FIG. 6.

Next, in step S102, the control unit 108 causes the development processing unit 403 to perform development processing for the image data to generate image data, and the distortion corrector 404 to perform distortion correction processing for the image data. The display processing unit 406 then generates display image data from the image data after distortion correction processing, and causes this to be displayed on the display unit 110, which is a work monitor. As described above, the display image combining the front image and the work area image is displayed on the display unit 110.

Next, the control unit 108 executes the processing of steps S103 to S107 and the processing of steps S108 to S112 in parallel. The processing of steps S105 to S107 and steps S110 to S112 correspond to predetermined processing that differs according to the type of object detected.

In step S103, the control unit 108 performs object detecting processing for the image data of the front image in the object detector 405. At this time, the learning data applied to the object detecting processing is limited to obstacles such as a person and a traffic cone.

Next, in step S104, the control unit 108 determines whether or not an obstacle has been detected in step S103. In a case where no obstacle has been detected, this flow ends, and in a case where an obstacle has been detected, the flow proceeds to step S105.

In step S105, the control unit 108 calculates the position of the detected obstacle in the display image (front image), and superimposes an obstacle detecting frame surrounding the obstacle on the display image according to the calculation result. Thereby, any obstacles can be clearly displayed on the work monitor.

Next, in step S106, the control unit 108 outputs an alert signal regarding safety from the stop determining unit 407 to the alert unit 109. The alert unit 109, upon receiving this, turns on a red alert light or generates a buzzer sound indicating that an obstacle has been detected. Thereby, not only the operator of the road roller 100 but also surrounding workers can be notified of the detection of the obstacle.

Next, in step S107, the control unit 108 performs processing of sending a stop signal from the stop determining unit 407 to the drive unit 111 to stop driving (working) of the road roller 100. At this time, instead of the stopping processing, processing of decelerating the road roller 100 may be performed. Thereby, the road roller 100 can be avoided from contacting the obstacle even if the operator of the road roller 100 does not notice the obstacle.

In step S108, the control unit 108 performs object detecting processing for the image data of the work area image in the object detector 405. At this time, the learning data applied to the object detecting processing is limited to foreign objects such as fallen leaves and a rock.

Next, in step S109, the control unit 108 determines whether or not a foreign object has been detected in step S108. In a case where no foreign object has been detected, this flow ends, and in a case where a foreign object has been detected, the flow proceeds to step S110.

In step S110, the control unit 108 calculates the position of the detected foreign object within the display image (work area image), and superimposes a foreign object detecting frame surrounding the foreign object on the display image according to the calculation result. Thereby, the foreign object can be clearly displayed on the work monitor.

Next, in step S111, the control unit 108 outputs an alert signal regarding the work quality from the stop determining unit 407 to the alert unit 109. In response, the alert unit 109 turns on a yellow alert light indicating that a foreign object has been detected, or generates a buzzer sound different from that in a case where an obstacle has been detected. Thereby, not only the operator of the road roller 100 but also surrounding workers can be notified that the foreign object has been detected.

Next, in step S112, the control unit 108 performs processing to send a stop signal from the stop determining unit 407 to the drive unit 111 to stop driving (working) the road roller 100. Thereby, the foreign object is prevented from being compacted by the road roller 100, i.e., a decrease in work quality is prevented, even if the operator of the road roller 100 does not notice the foreign object.

The above camera control processing can secure safety and work quality in front of the road roller 100 while reducing the burden on the operator, using image data obtained through one imaging unit 107.

This embodiment changes the resolution according to the angle of view by setting the optical characteristic of the optical system in the imaging unit. Alternatively, the resolution may be varied according to the angle of view by changing the pixel density in the image sensor in the imaging unit. More specifically, the pixel density may be increased toward the periphery to make the peripheral side have a higher resolution than that on the central side. In addition, both the optical characteristic of the optical system and the imaging density of the image sensor may be set so that imaging can be performed at higher resolution on the peripheral side of the imaging angle of view than that on the central side.

As described above, this embodiment can monitor both the front in the moving direction and the work area of the service vehicle using image data obtained through a single camera (imaging unit) attached to the front of the service vehicle.

This embodiment has discussed an imaging system mounted on a service vehicle that drives on the ground, but the service vehicle may also be one that moves on a track (rail), on the water surface, or in the air. An imaging system similar to that of this embodiment can be mounted not only on a service vehicle, but also on various movable units such as general automobiles and other vehicles, ships, aircraft, and industrial robots.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™, a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

In each embodiment, a single imaging unit can simultaneously perform imaging of the first, second, and third imaging areas, and can perform high resolution imaging of the first and third imaging areas.

This application claims priority to Japanese Patent Application No. 2023-140387, which was filed on Aug. 30, 2023, and which is hereby incorporated by reference herein in its entirety.

What is claimed is:

1. An imaging system comprising:
an imaging unit disposed on a movable unit; and
a processor configured to output image data acquired by the imaging unit to a display unit,
wherein the imaging unit is configured to perform imaging at a higher resolution in a peripheral area of an imaging angle of view than that in a central area,
wherein a first imaging area in front of the movable unit in a moving direction of the movable unit is imaged in a part of the peripheral area, a second imaging area is imaged in the central area, and a third imaging area closer to the movable unit than the second imaging area is imaged in another part of the peripheral area,
wherein the imaging unit includes an image sensor and an optical system configured to form an optical image on a light receiving surface of the image sensor, and
wherein the following inequality is satisfied:

$$0.20 \leq 2f\tan(\theta\max/2)/y(\theta\max) \leq 0.95.$$

where f is a focal length of the optical system, $y(\theta)$ is a projection characteristic that represents a relationship between a half angle of view $\theta$ of the optical system and an image height y on an image plane, and $\theta$ max is a maximum half angle of view of the optical system.

*   *   *   *   *